United States Patent [19]
Pengov

[11] Patent Number: 6,051,903
[45] Date of Patent: *Apr. 18, 2000

[54] SWITCHED RELUCTANCE MOTOR

[75] Inventor: Wayne A. Pengov, Chardon, Ohio

[73] Assignee: Tridelta Industries, Inc., Mentor, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/170,695

[22] Filed: Oct. 13, 1998

Related U.S. Application Data

[63] Continuation-in-part of application No. 08/545,085, Oct. 19, 1995, Pat. No. 5,852,334.

[51] Int. Cl.$^7$ .......................... H02K 17/42; H02K 19/00; H02K 1/00; H02K 1/22; H02K 23/00
[52] U.S. Cl. .......................... 310/168; 310/162; 310/185; 310/193; 310/261; 310/269; 318/254; 318/701
[58] Field of Search ..................... 310/168, 171, 310/185, 186, 216, 254, 258, 259, 261, 166, 193, 269, 49 R, 162, 179, 191, 209, 40 R; 29/598; 340/815.64; 318/701, 747, 254

[56] References Cited

U.S. PATENT DOCUMENTS

| | | |
|---|---|---|
| 1,234,914 | 7/1917 | Latour . |
| 1,250,752 | 12/1917 | Alexanderson . |
| 1,597,453 | 8/1926 | Merrill . |
| 1,799,156 | 4/1931 | Dornig . |
| 2,732,509 | 1/1956 | Hammerstrom et al. ............... 310/168 |
| 3,098,164 | 7/1963 | Inoue ..................... 310/111 |
| 3,732,561 | 5/1973 | McGinnis ............................. 340/378 R |
| 4,491,790 | 1/1985 | Miller ..................... 324/142 |
| 4,575,652 | 3/1986 | Gogue ..................... 310/49 R |
| 4,583,015 | 4/1986 | Toshimitsu ............... 310/187 |
| 4,626,719 | 12/1986 | Foster ..................... 310/49 R |
| 4,748,362 | 5/1988 | Hedlund ..................... 310/168 |
| 4,766,359 | 8/1988 | Smith et al. ............... 318/652 |
| 4,883,999 | 11/1989 | Hendershot ............... 310/254 |
| 4,943,747 | 7/1990 | Lee ............... 310/67 R |
| 4,995,159 | 2/1991 | Hancock et al. ............... 29/596 |
| 4,998,052 | 3/1991 | Erdman et al. ............... 318/701 |
| 5,023,502 | 6/1991 | Johnson ............... 310/261 |
| 5,075,610 | 12/1991 | Harris ............... 318/701 |
| 5,095,238 | 3/1992 | Suzuki et al. ............... 310/156 |
| 5,111,095 | 5/1992 | Hendershot ............... 310/168 |
| 5,111,096 | 5/1992 | Horst ............... 310/168 |

(List continued on next page.)

FOREIGN PATENT DOCUMENTS

| | | |
|---|---|---|
| 0 695020 A2 | of 0000 | European Pat. Off. . |
| 733158 | of 0000 | United Kingdom . |
| WO 97/15108 | 4/1997 | WIPO . |

OTHER PUBLICATIONS

T.J.E. Miller; Switched Reluctance Motors and Their Control, 1993, pp. 2–3, 8–9, 14–15, 26–47, New York.

Primary Examiner—Nestor Ramirez
Assistant Examiner—Dang Dinh Le
Attorney, Agent, or Firm—Mark Kusner

[57] ABSTRACT

A switched reluctance motor driven by a two-phase source, includes a stator having an even number of evenly-spaced, like stator poles defining a gap between each stator pole; windings for each of the two phases of the motor wound about stator poles that are circumferentially separated by a winding and an associated stator pole of a different phase; and a rotor mounted for rotation relative to the stator, the rotor having an even number of rotor poles, the rotor poles being dimensioned such that when the phases are alternately energized, the rotor poles operatively interact with the stator poles such that the motor advances sequentially to a first state wherein one-third of the rotor poles are magnetically coupled to a like number of the stator poles, to a second state wherein two-thirds of the rotor poles are magnetically coupled to a like number of stator poles and to a third state wherein all of the rotor poles are magnetically coupled to a like number of stator poles.

32 Claims, 7 Drawing Sheets

U.S. PATENT DOCUMENTS

| | | | |
|---|---|---|---|
| 5,122,697 | 6/1992 | Horst | 310/181 |
| 5,294,856 | 3/1994 | Horst | 310/181 |
| 5,517,102 | 5/1996 | Jensen | 318/701 |
| 5,545,938 | 8/1996 | Mecrow | 310/156 |
| 5,574,342 | 11/1996 | Okamoto | 318/254 |
| 5,604,388 | 2/1997 | Baker et al. | 310/51 |
| 5,652,493 | 7/1997 | Hendershot, Jr. | 318/701 |
| 5,701,065 | 12/1997 | Ishizaki | 318/701 |
| 5,719,453 | 2/1998 | Horst | 310/68 R |
| 5,719,456 | 2/1998 | Kolomeitsev | 310/112 |
| 5,747,962 | 5/1998 | Fulton | 318/701 |
| 5,801,463 | 9/1998 | Suzuki et al. | 310/51 |
| 5,844,343 | 12/1998 | Horst | 310/184 |

SWITCHED RELUCTANCE MOTOR

This application is a continuation-in-part of application Ser. No. 08/545,085 filed on Oct. 19, 1995, now U.S. Pat. No. 5,852,334.

FIELD OF THE INVENTION

The present invention relates generally to switched reluctance motors, and more particularly to a switched reluctance motor having a low noise operating characteristic.

BACKGROUND OF THE INVENTION

Noise has always been an undesirable characteristic of switched reluctance motors. Two-phase switched reluctance motors tend to produce a noticeable whine during operation. The noise is believed to be generated by vibration of the stator as it is deformed during each phase energization and deenergization. In this respect, a stator of two-phase switched reluctance motors is typically comprised of a ring having a plurality of inwardly extending stator poles. During each phase energization, opposed stator poles are electrically energized to form a magnetic field that draws the rotor into alignment therewith. The magnetic field that draws the rotor into alignment with the stator poles also deforms the stator by drawing energized stator poles towards the rotor. These attractive forces tend to distort the stator ring from its generally circular configuration. Stated another way, the opposite attractive forces may "ovalize" the stator as opposed, energized poles are drawn toward the axis of the rotor. Upon de-energization of the stator poles, the stator "springs" or "snaps" back to its original circular configuration. It will of course be appreciated that distortion of the stator pole is extremely slight. Nevertheless, the distortion produced during each phase energization and de-energization causes the entire motor to "vibrate" during continuous operation, thereby producing the undesirable acoustical noise.

U.S. patent application Ser. No. 08/545,085 to Pengov discloses a two-phase switched reluctance motor that, among other things, addresses the noise problems of two-phase switched reluctance motors. The disclosed motor has a rotor with wide rotor poles and narrow rotor poles. During each phase energization, the rotor is sequentially advanced in a two-step fashion. In the 8/4 switched reluctance motor shown in the '085 application, during the first step, the leading edges of the wide rotor poles interact with a first pair of opposed energized stator poles. During the second step, narrow rotor poles are drawn into alignment with a second set of opposed stator poles. Importantly, because of the width of the wide rotor poles, the attractive forces exerted on this second set of opposed stator poles takes place while radial attractive forces are still exerted on the first set of opposed stator poles. Thus, during each phase energization, the stator first experiences opposed inward forces, 180° apart, drawing the stator out of round, then during the second phase, experience a second set of forces, 180° apart but 90° to the first forces, drawing the sides of the stator inwardly. The original radial forces thus are offset by the second set of radial forces that are 90° therefrom. As a result, during the second step or portion of each phase energization, the stator is generally balanced by inward radial forces 90° apart created by two sets of opposed stator poles. Upon deenergization of a phase, rather than switching from an oval configuration to a round configuration, the generally balanced stator relaxes more uniformly. The motor shown in U.S. patent application Ser. No. 08/545,085 thus, in addition to the other operating characteristics resulting from the unique rotor design, provides a less noisy two-phase switched reluctance motor.

The present invention provides a modification to the motor disclosed in U.S. patent application Ser. No. 08/545,085 and provides a switched reluctance motor wherein the internal attractive force between stator and rotor poles are distributed at a greater number of locations angularly about the axis of the motor.

SUMMARY OF THE INVENTION

In accordance with the present invention, there is provided a switched reluctance machine comprising a first stationary element having a plurality of uniformly-spaced like stationary poles, and a second element comprised of a first pole having a first pole face of a first size, a second pole having a second pole face of a second size, and a third pole having a third pole face of a third size. The first, second and third poles are spaced from each other in a predetermined direction. Windings for two phases are wound about poles of the first element such that each pole is separated by a winding and an associated pole of a different phase. The first element is disposed relative to the second element wherein energization of one of the two phases causes the second element to move a predetermined distance in the predetermined direction relative to the first element, the first pole of the second element being in minimum reluctance relation with a first uniform pole of the first element when the second element has moved a first portion of the predetermined distance. The second pole of the second element is in a minimum reluctance relation with a second uniform pole of the first element when the second element has moved another portion of the predetermined distance, the first pole of the second element remaining in a minimum reluctance relation with the first uniform pole of the first element when the second pole of the second element is in a minimum reluctance relationship with the second uniform pole of the first element. The third pole of the second element is in a minimum reluctance relation with a third uniform pole of the first element when the second element has moved another portion of the predetermined distance, the first and second poles of the second element remaining in a minimum reluctance relation with the first and second uniform poles respectively of the first element when the third pole of the second element is in a minimum reluctance relationship with the third uniform pole of the first element.

In accordance with another aspect of the present invention, there is provided a switched reluctance motor driven by a two-phase source comprising a stator having a plurality of evenly spaced, radially oriented like poles and windings for each of the two phases of the motor wound about the stator poles such that each of the stator poles is circumferentially separated by a winding and an associated stator pole of a different phase. A rotor element is mounted for rotation relative to the stator. The rotor element has a wide rotor pole, an intermediate rotor pole and a narrow rotor pole. The rotor poles are distributed on the rotor wherein the rotor poles travel along a same circumferential path in a direction of rotation. The rotor poles are dimensioned such that the energization of one of the two phases causes the wide rotor pole to interact with a first stator pole to induce a first torque on the rotor element and to produce a first predetermined angular rotation of the rotor element, and thereafter causes the intermediate rotor pole to interact with a second stator pole to induce a second torque on the rotor element and to produce a second predetermined angular rotation of the rotor element, and thereafter causes the narrow pole to interact with a third stator pole to induce a third torque on the rotor element and to produce a third predetermined angular rotation on the rotor element.

In accordance with another aspect of the present invention, there is provided a switched reluctance motor driven by a two-phase source, comprising a stator having a plurality of evenly distributed, like poles thereon, each of the poles having a stator pole face and windings for each of the two phases of the motor wound about the stator poles such that each of the stator poles is circumferentially separated by at least one winding and an associated stator pole of a different phase. A rotor element is mounted for rotation relative to the stator. The rotor element having a wide rotor pole having a wide rotor pole face, an intermediate rotor pole having an intermediate rotor pole face and a narrow rotor pole having a narrow rotor pole face. The rotor poles are distributed on the rotor wherein the narrow rotor pole, the intermediate rotor pole and the wide rotor pole travel along a same circumferential path. The rotor poles are dimensioned such that energization of one of the phases causes a predetermined angular rotation of the rotor wherein a first portion of the angular rotation is created by the wide rotor pole being drawn into a minimum reluctance position relative to a first energized stator pole, a second portion of the angular rotation is created by the intermediate rotor pole being drawn into a minimum reluctance position with a second energized stator pole and a third portion of the angular rotation is created by the narrow rotor pole being drawn into a minimum reluctance position with a third energized stator pole.

In accordance with another aspect of the present invention, there is provided a switched reluctance motor driven by a two-phase source, comprising a stator having a plurality of like, evenly distributed, radially oriented stator poles, each of the poles having a stator pole face, and windings for each of the two phases of the motor wound about the stator poles such that adjacent stator poles are circumferentially separated by at least one winding and an associated stator pole of a different phase. A rotor element is mounted for rotation relative to the stator. The rotor element has a wide rotor pole having a wide rotor pole face, an intermediate rotor pole having an intermediate rotor pole face and a narrow rotor pole having a narrow rotor pole face. The rotor poles are distributed on the rotor wherein the narrow rotor pole, the intermediate rotor pole and the wide rotor pole travel along a same circumferential path. The rotor and stator poles are dimensioned such that a uniform gap is defined between the rotor pole faces and the stator pole faces and energization of one of the two phases causes the wide rotor pole to magnetically interact with a first stator pole, causes the intermediate rotor pole to magnetically interact with a second stator pole and causes the narrow rotor pole to magnetically interact with a third stator pole to rotate the rotor a predetermined angular amount. An area of overlap of the rotor pole faces relative to the stator pole faces increases as the rotor moves the predetermined angular amount.

In accordance with another aspect of the present invention, there is provided a switched reluctance motor driven by a two-phase source, comprising a stator having a plurality of like, evenly distributed, radially oriented stator poles, each of the stator poles having a stator pole face, and windings for each of the two phases of the motor wound about the stator poles such that each of the stator poles is circumferentially separated by at least one winding and an associated stator pole of a different phase. A rotor element is mounted for rotation relative to the stator. The rotor element has a wide rotor pole having a wide rotor pole face, an intermediate rotor pole having an intermediate rotor pole face and a narrow rotor pole having a narrow rotor pole face. The rotor poles are distributed on the rotor wherein the narrow rotor pole, the intermediate rotor pole and the wide rotor pole travel along a same circumferential path. The rotor poles are dimensioned relative to the stator poles such that the motor has an inductance-to-angular rotation profile wherein the inductance of a phase increases over a first angle of rotation and decreases over a second angle of rotation and the first angle of rotation is at least twice the second angle of rotation.

In accordance with another aspect of the present invention, there is provided a switched reluctance motor, comprised of a stator having a plurality of evenly spaced, radially oriented, like stator poles, the number of stator poles being a whole number multiple of three and even, and a rotor element mounted for rotation relative to the stator. The rotor element has a plurality of rotor poles, the number of rotor poles being one-half the number of stator poles. One-third of the rotor poles are wide rotor poles, one-third of the rotor poles are intermediate rotor poles and one-third of the rotor poles are narrow rotor poles. The rotor poles are distributed on the rotor wherein a narrow rotor pole, an intermediate rotor pole and a wide rotor pole travel in a same circumferential path. The rotor is dimensioned such that the width of each of the wide rotor poles spans a length equal to at least the width of one stator pole and the length of a gap adjacent the stator pole; the width of each of the intermediate rotor poles spans at least the length of one stator pole and half of a gap adjacent the stator pole and the width of each of the narrow rotor poles spans the length of at least one stator pole. Windings for two phases are wound about stator poles that are circumferentially separated by at least one winding and an associated stator pole of a different phase.

In accordance with the present invention, there is provided a switched reluctance motor driven by a two-phase source, comprising a stator having twelve (12) evenly spaced, radially oriented, like poles defining a gap between adjacent stator poles, and windings for each of the two phases of the motor wound about the stator poles wherein the stator poles are circumferentially separated by a winding and an associated stator pole of a different phase. A rotor is mounted for rotation relative to the stator. The rotor has six (6) rotor poles. The rotor is dimensioned such that, during each phase energization the motor has a first state wherein two (2) of the rotor poles are magnetically coupled to a like number of stator poles, a second state wherein four (4) of the rotor poles are magnetically coupled to a like number of stator poles and a third state wherein all six (6) of the rotor poles are magnetically coupled to a like number of energized stator poles.

In accordance with the present invention, there is provided a switched reluctance motor driven by a two-phase source, comprising a stator having an even number of evenly-spaced, like stator poles defining a gap between each stator pole, the number of stator poles being a whole number multiple of three. Windings for each of the two phases of the motor are wound about stator poles that are circumferentially separated by a winding and an associated stator pole of a different phase. A rotor is mounted for rotation relative to the stator. The rotor has at least three rotor poles. The rotor poles are dimensioned such that when the phases are alternately energized, the rotor poles operatively interact with the stator poles such that the motor sequentially advances to a first state wherein one-third of the rotor poles are magnetically coupled to a like number of the stator poles, to a second state wherein two-thirds of the rotor poles are magnetically coupled to a like number of stator poles and to a third state wherein all of the rotor poles are magnetically coupled to a like number of stator poles.

It is an object of the present invention to provide a switched reluctance motor exhibiting reduced acoustical noise during operation.

Another object of the present invention is to provide a switched reluctance motor as described above that more uniformly balances the internal attractive forces experienced by the stator and rotor during each phase energization.

Another object of the present invention is to provide a switched reluctance motor as described above wherein the switched reluctance motor is a two-phase motor.

A still further object of the present invention is to provide a switched reluctance motor as described above wherein the rotor is comprised of a plurality of stacked laminations formed of a magnetically permeable material.

A still further object of the present invention is to provide a switched reluctance motor as described above wherein the rotor includes rotor poles having at least three different sizes.

A still further object of the present invention is to provide a switched reluctance motor as described above wherein, during each phase energization, the rotor moves a predetermined angular amount and a first portion of the angular amount is caused by a first sized rotor pole interacting with a first stator pole, a second portion of the angular amount is caused by a second sized rotor pole interacting with a second stator pole and a third portion of the angular amount is caused by a third sized rotor pole interacting with a third stator pole.

These and other objects and advantages will become apparent from the following description of preferred embodiments of the present invention taken together with the accompanying drawings.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein.

DETAILED DESCRIPTION OF PREFERRED EMBODIMENT

Figure 1:
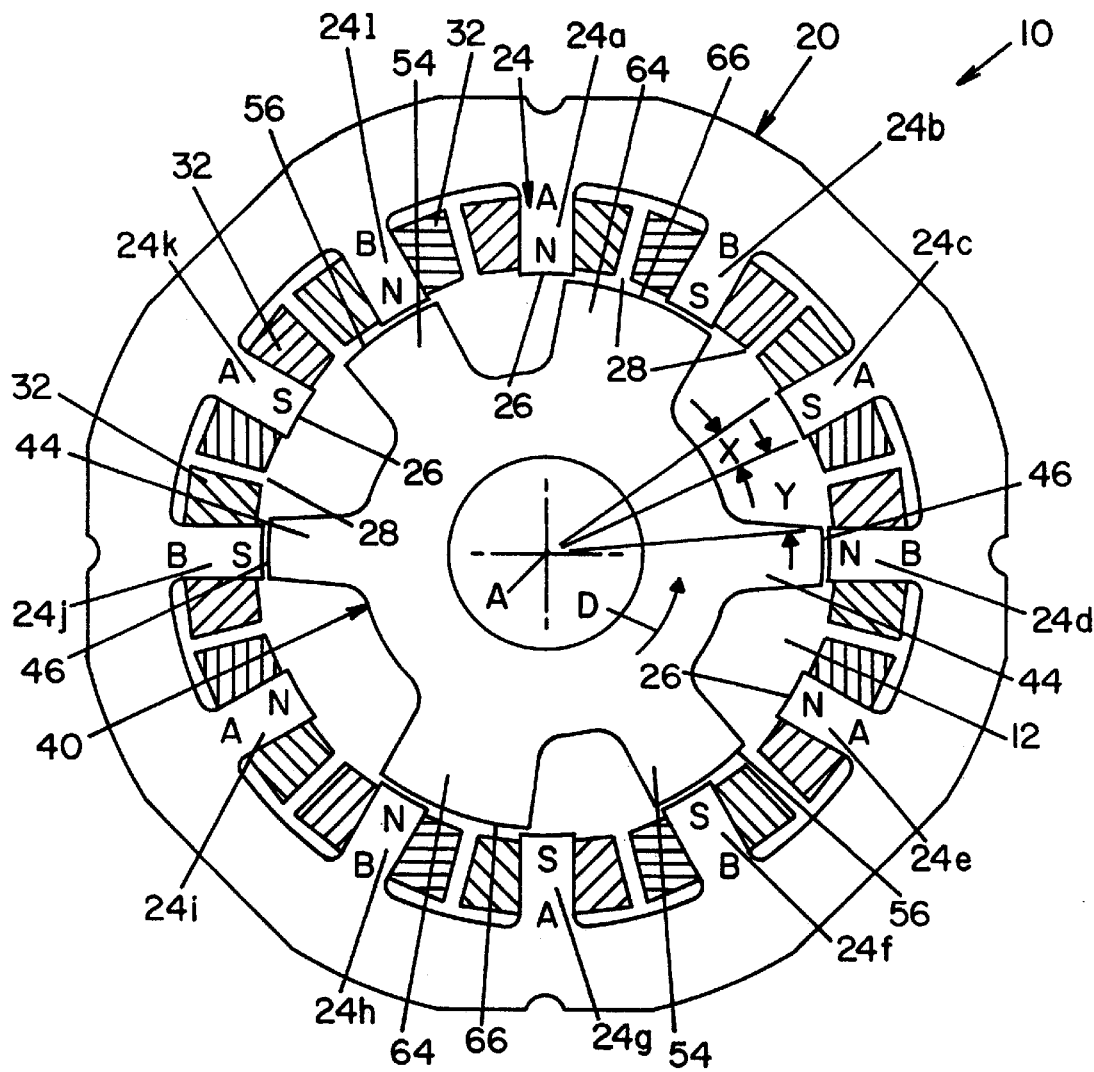
FIG. 1 is a sectional view of a 12/6 switched reluctance motor illustrating a preferred embodiment of the present invention.

Referring now to the drawings wherein the showings are for the purpose of illustrating preferred embodiments of the invention only, and not for the purpose of limiting same, FIG. 1 shows a cross-sectional view of a two-phase switched reluctance motor 10 illustrating a preferred embodiment of the present invention. In the embodiment shown, a 12-stator pole/6-rotor pole switched reluctance motor is shown. Motor 10, as shown in FIG. 1, is a modification of a motor shown and disclosed in U.S. patent application Ser. No. 08/545,085 to Pengov, the disclosure of which is expressly incorporated herein by reference. Specifically, the present invention relates to a motor having a rotor having rotor poles of at least three different sizes to more evenly distribute the internal attractive forces exerted between the stator and rotor during each phase energization so as to reduce acoustical noise during the operation of the motor.

Motor 10 is comprised of a stator 20 and a rotor 40. Stator 20 is comprised of a stack of plate laminations (not shown) that are formed of a ferromagnetic material or a magnetically permeable material. The laminations are stacked face-to-face and suitably adhered to one another by means conventionally known in the art. Stator 20 includes a plurality of like, radially oriented stator poles 24. In the embodiment shown, stator poles 24 extend radially inwardly toward an axis, designated A, that extends through motor 10. Each stator pole 24 has an inwardly facing, concave stator pole face 26. In the embodiment shown, stator 20 has 12 like stator poles, designated 24a, 24b, 24c, 24d, 24e, 24f, 24g, 24h, 24i, 24j, 24k and 24l. Like gaps 28 are defined between adjacent stator pole faces 26.

In this respect, the width of stator poles 24a–24l and the width of gaps 28 are matters of design choice that take into account copper space, tooth saturation, torque overlap, etc. In accordance with the present invention, the angular dimension of gaps 28 may be different from the angular dimension of stator pole faces 26. In the embodiment shown in FIGS. 1–6, each stator pole face 26 of stator poles 24a–24l has an angular dimension "X" of about 11°, and each gap 28 has an angular dimension "Y" of about 19°. Since stator 20 in FIGS. 1–6 has twelve (12) stator poles 24a–24l, one pole face 26 and one gap 28 together have an angular dimension of 30°. However, as will be appreciated from a further reading of the present application, while a pole face 26 and a gap 28 in a 12-pole stator will always have an angular dimension of 30°, the size of a pole face 26 relative a gap 28 may vary. In accordance with the present invention, the dimensions of stator pole face 26 and gap 28 may preferably vary between one preferred limit where pole face 26 and gap 28 have the some angular dimension and a second preferred limit where gap 28 has an angular dimension twice the angular dimension of a pole face 26. In a 12-stator pole/6-rotor pole switched reluctance motor as shown in FIGS. 1–6, the dimensions of stator pole face 26 and gap 28 would preferably vary between a first limit, wherein each stator pole face 26 has an angular dimension of about 15° and each gap 28 has an angular dimension of about 15°, and a second limit, wherein each stator pole face 26 has angular dimension of about 10° and each gap 28 has an angular dimension of about 20°. Stated another way, in the 12/6 switched reluctance motor shown in FIGS. 1–6, the angular dimension of the stator pole face(s) 26 may be between 10° and 15°, and the angular dimension of gap(s) 28 may be between 15° and 20°, wherein the combined angular dimension of a stator pole face 26 and a gap 28 is 30°.

Figure 2:
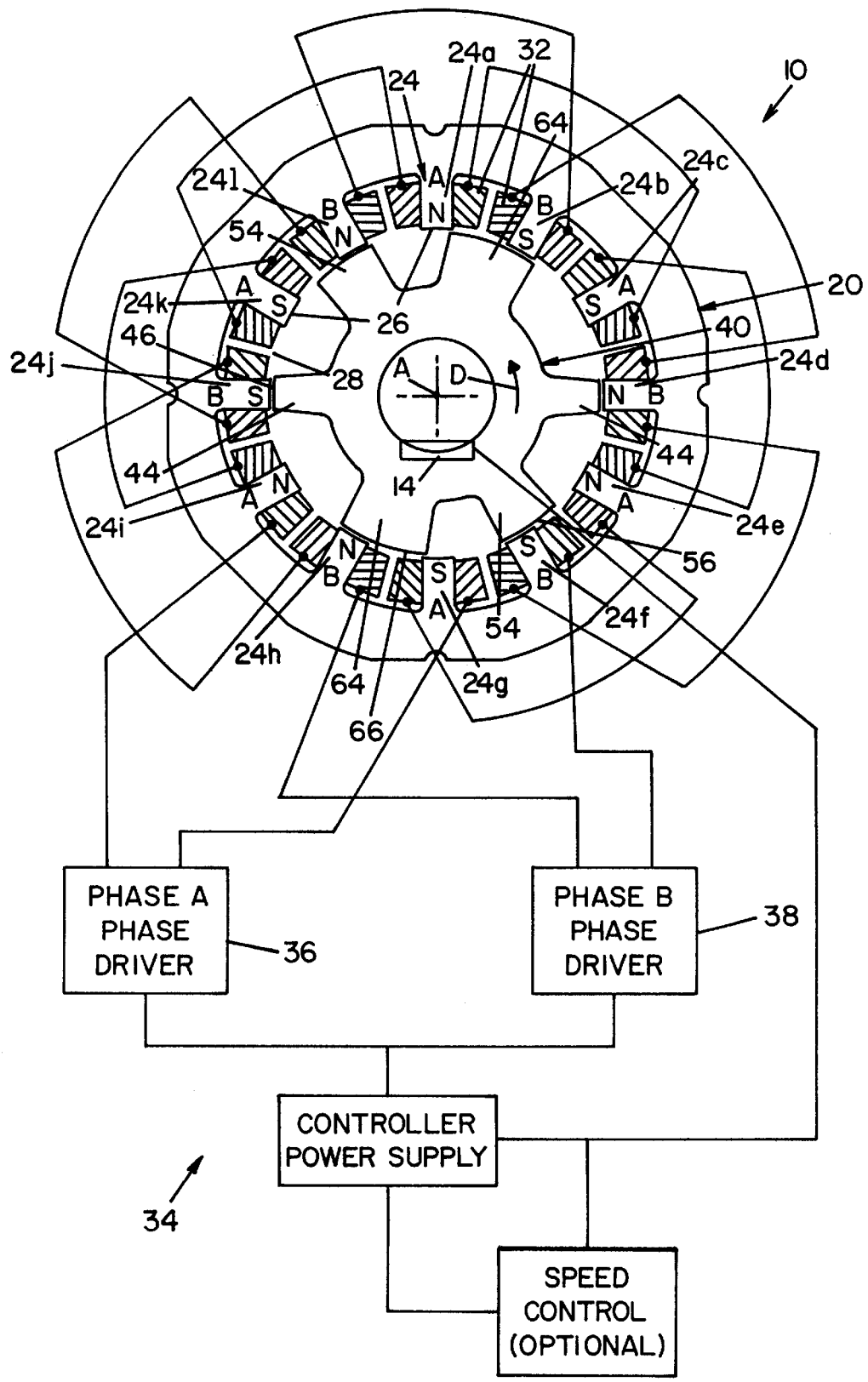
FIG. 2 is a sectional view of the switched reluctance motor shown in FIG. 1, schematically illustrating associated control and operational circuitry connected thereto.

Stator pole faces 26 define a central bore 12 for receiving rotor 40. An electrical conductor 32 is wound about each stator pole 24. As schematically illustrated in FIG. 2, conductors 32 are connected to an electrical current pulse generating circuit 34 comprised of a phase A phase driver and a phase B phase driver 38. Conductors 32 are connected to phase A driver 36 and phase B driver 38 as shown in FIG. 2 to create stator poles of two phases, namely phase A and phase B, as shown in the figures. In the embodiment shown in FIGS. 1–6, stator poles 24a, 24c, 24e, 24g, 24i and 24k are connected as phase A stator poles, and stator poles 24b, 24d, 24f, 24h, 24j and 24l are connected as phase B stator poles. As shown in FIG. 1, adjacent stator poles 24 have a different phase, and diametrically opposed stator poles 24 have opposite polarities. The current pulse generating circuit 34 is conventional in the art, and is operable to selectively generate pulses of electrical current through conductors 32. The timing and magnitude of current pulses generated by current pulse generating circuit 34 is determined by a position sensor 14. Position sensor 14 is connected between stator 20 and rotor 40 and provides a signal indicative of the relative position of rotor 40 relative to stator 20.

Referring now to rotor 40, like stator 20, rotor 40 is comprised of a stack of plate laminations (not shown) that are formed of a ferromagnetic material or magnetically permeable material. In the embodiment shown, rotor 40 is comprised of like laminations. Rotor 40 has diametrically opposed narrow rotor poles 44 having narrow rotor pole faces 46, diametrically opposed intermediate rotor poles 54 having intermediate rotor pole faces 56, and diametrically opposed wide rotor poles 64 having wide rotor pole faces 66. The dimensions of rotor poles 44, 54 and 64 are to a certain extent based upon the dimensions of stator pole face(s) 26 and gap(s) 28. Broadly stated, narrow rotor pole face 46 is dimensioned to be at least as large as a stator pole face 26, and preferably slightly larger (about 2 radial degrees or less) than stator pole face 26. Intermediate rotor pole face 46 is dimensioned to be at least as large as a stator pole face 26 and one-half a gap 28 adjacent a stator pole face 26. Preferably, intermediate rotor pole face 56 is slightly larger than a stator pole face 26, and one-half a gap 28 adjacent a stator pole face. Wide rotor pole face 66 is dimensioned to be at least as large as a stator pole face 26 and a gap 28 adjacent a stator pole face. Preferably, wide rotor pole face 66 is slightly larger than one stator pole face 26 and a gap 28 adjacent thereto. In the 12/6 switched reluctance motor shown in FIGS. 1–6, the angular dimension of narrow rotor pole face 46 is preferably approximately equal to the angular dimension of stator pole face 26, and more preferably slightly larger (about 1 radial degree) than stator pole face 26. Intermediate rotor pole face 56 preferably has an angular dimension about twice the angular dimension of stator pole face 26. Wide rotor pole face 66 is preferably dimensioned to have an angular dimension about three times the angular dimension of stator pole face 26. Specifically, in the embodiment shown in FIGS. 1–6 (where stator 20 is dimensioned to have stator pole faces 26 of about 11°), narrow rotor pole face 46 is approximately 12°, intermediate rotor pole face 56 is approximately 23° and wide rotor pole face 46 is approximately 34°.

Narrow rotor poles 44, intermediate rotor poles 54 and wide rotor poles 64 are disposed on rotor 40 wherein the rotor poles travel along a same circumferential path. In other words, each rotor lamination or rotor section has at least one narrow rotor pole 44, an intermediate rotor pole 54 and a wide rotor pole 64 thereon. Rotor 40 is designed to rotate in a preferred direction indicated by arrow "D" in FIG. 1. Specifically, narrow rotor pole 44, intermediate rotor pole 54 and wide rotor pole 64 are oriented relative to each other, such that the trailing portion of wide rotor pole 64, in the direction of preferred rotation, is aligned with a first stator pole of one phase, and the trailing portion of intermediate rotor pole 54, in the same preferred direction of rotor rotation, is aligned with a second stator of the same phase when narrow rotor pole 44 is aligned with a third stator pole of the same phase. This configuration is illustrated in FIG. 1 wherein the trailing edge of wide rotor pole 64 is aligned with stator pole 24b, the trailing edge of intermediate rotor pole 54 is aligned with stator pole 24l and narrow rotor pole 44 is aligned with stator pole 24j. As perhaps best illustrated in FIG. 1, the trailing ends or edges of each rotor pole, determined with respect to the preferred direction of rotation, are equally spaced from each other. In the embodiment shown, the trailing edge of each of the rotor poles is about 60 degrees apart.

Referring now to the operation of motor 10, during each phase energization, rotor 40 moves through three identifiable states or steps as wide rotor pole 64, intermediate rotor pole 54 and narrow rotor pole 44 sequentially interact with stator poles 26 to rotate rotor 40 a predetermined angular amount. In the embodiment shown, during each phase energization, rotor 40 rotates about axis A approximately 30 angular degrees. Of this predetermined angular rotation, each rotor pole, i.e., wide rotor pole 64, intermediate rotor pole 54 and narrow rotor pole 44, produces one-third of the predetermined angular rotation. In other words, in the embodiment shown, each of the various sized rotor poles produces approximately 10 degrees of angular rotation.

Figure 3:
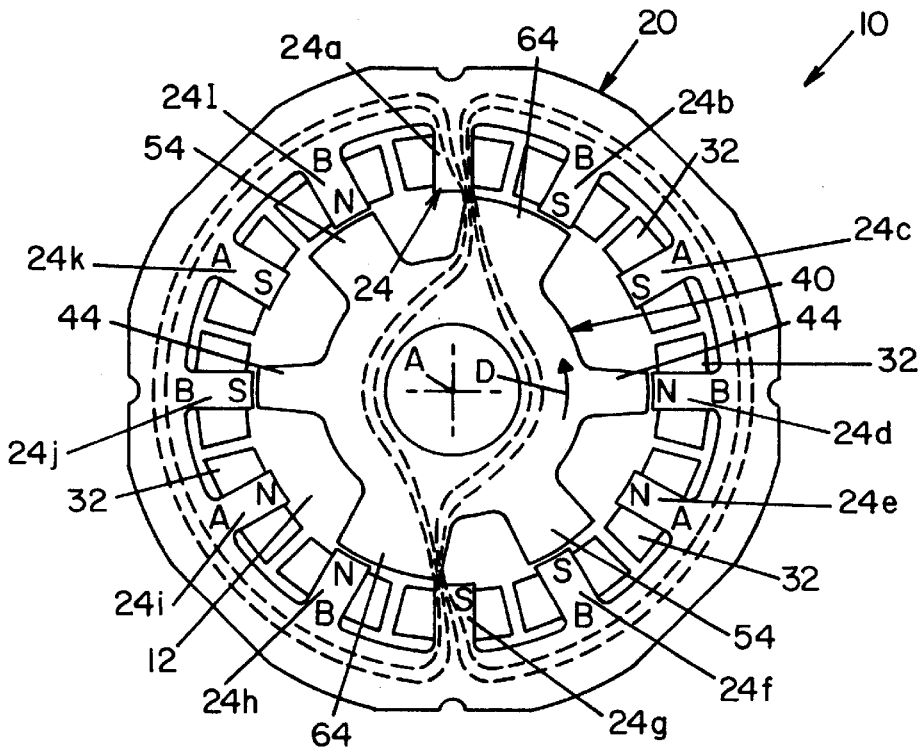
FIG. 3 is a sectional view of the switched reluctance motor shown in FIG. 1, taken at the instant of energization of phase A, schematically showing the flux pattern generated thereby.
Figure 4:
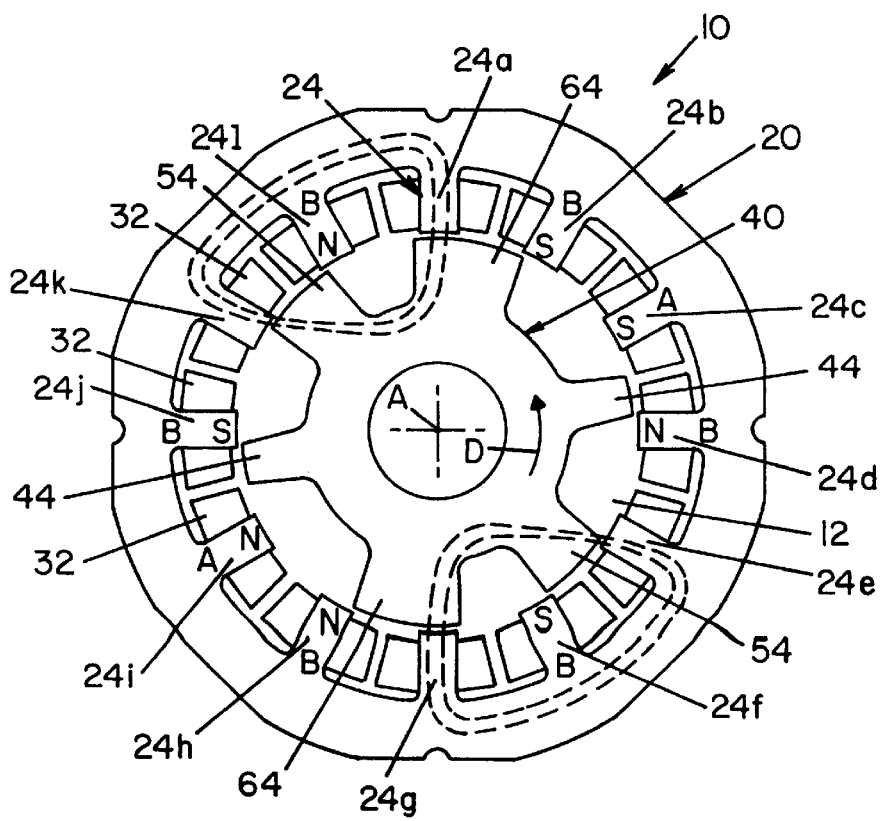
FIG. 4 is a sectional view of the switched reluctance motor shown in FIG. 1, showing the motor in a first state during phase A energization wherein the wide rotor poles are in minimum reluctance position with a like number of energized stator poles.
Figure 5:
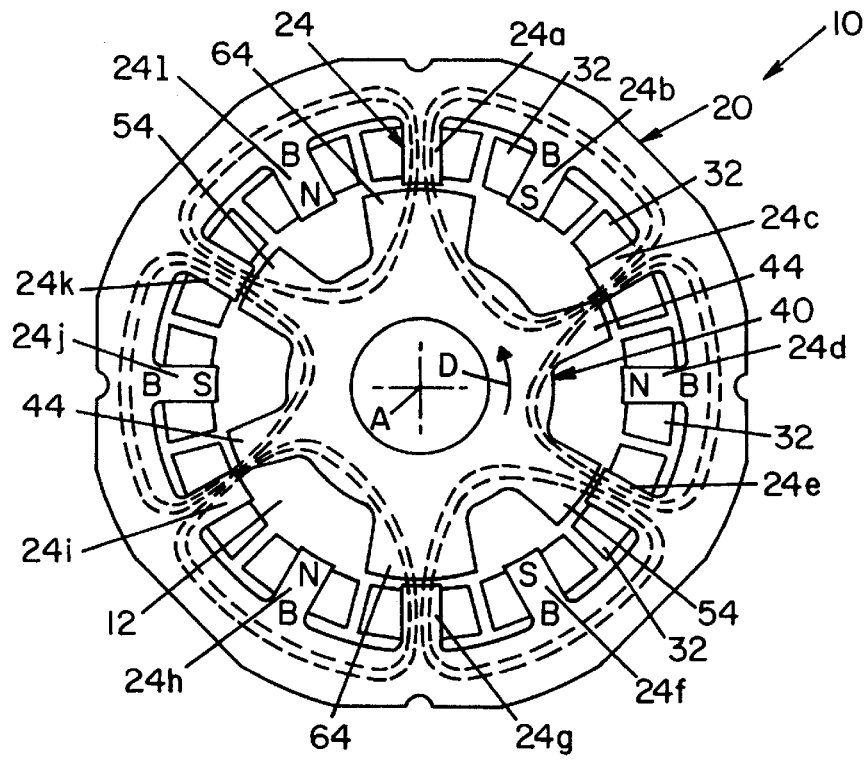
FIG. 5 is a sectional view of the switched reluctance motor shown in FIG. 1, showing the motor in a second state during phase A energization wherein the intermediate rotor poles and wide rotor poles are in minimum reluctance position with a like number of energized stator poles.
Figure 6:
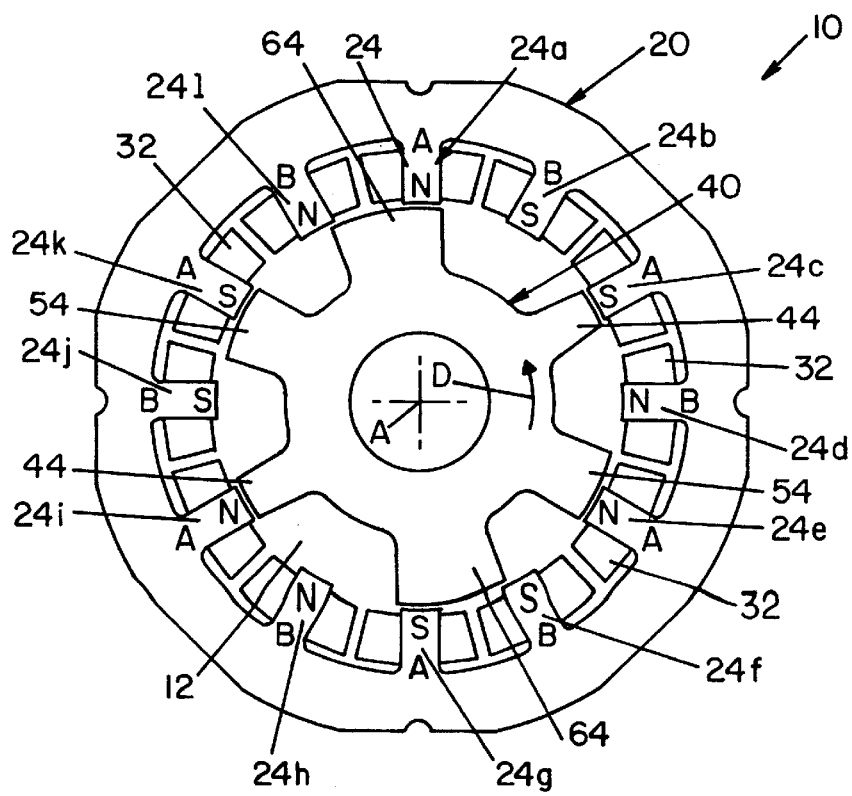
FIG. 6 is a sectional view of the switched reluctance motor shown in FIG. 1, showing the motor in a third state during phase A energization wherein the narrow rotor poles, the intermediate rotor poles and the wide rotor poles are in minimum reluctance position with a like number of energized stator poles.

Referring to FIG. 1, rotor 40 is shown in a position immediately prior to energization of phase A. Upon energization of phase A, stator poles 24a, 24c, 24e, 24g, 24i and 24k become energized. Energization of phase A causes wide rotor pole 64 to interact with energized stator poles 24a, 24g. FIG. 3 shows magnetic flux patterns produced in rotor 40 and stator 20 as a result of the initial steps of phase A energization. The attraction between wide rotor pole 64 and energized stator poles 24a and 24g causes rotor 40 to rotate in a counter-clockwise direction towards a position of minimum reluctance as illustrated in FIG. 4. As wide rotor poles 64 move into minimum reluctance position with energized stator poles 24a and 24g, intermediate rotor pole 54 has moved to a position wherein the leading edge of intermediate rotor pole 54 begins to magnetically interact with energized stator poles 24k and 24e. FIG. 4 shows magnetic flux patterns as magnetic loops are formed through wide rotor pole 64 and narrow rotor pole 54 and energized stator poles 24a and 24k and 24e and 24g. The interaction between intermediate rotor poles 54 and energized stator poles 24e and 24k causes the rotor to rotate farther in a counterclockwise direction to bring intermediate rotor poles 54 into minimum reluctance positions with energized stator poles 24e and 24k. Importantly, because of the dimensions of wide rotor poles 64, wide rotor poles 64 remain in minimum reluctance relationship with energized stator poles 24a and 24g while intermediate rotor poles 54 are in minimum reluctance relationship with stator poles 24e and 24k. FIG. 5 illustrates a second position of rotor 40 as intermediate rotor poles 54 have moved into minimum reluctance position with energized stator poles 24e and 24k. FIG. 5 thus illustrates a second state or condition of rotor 40 during phase A energization. The angular rotation created by intermediate rotor poles 54 moving into minimum reluctance position with energized stator poles 24e and 24k brings the leading edge of narrow rotor pole 44 into magnetic relationship with energized stator poles 24c and 24i. FIG. S shows magnetic flux patterns created as narrow rotor poles 44 begin to interact with energized stator poles 24c and 24i. The interaction between narrow rotor poles 44 and energized stator poles 24c and 24i cause rotor 40 to further rotate in a counter-clockwise direction until narrow rotor poles 44 are in a minimum reluctance relationship with energized stator poles 24c and 24i, as illustrated in FIG. 6. FIG. 6 thus illustrates a third state or step in the phase A energization. Importantly, because of the dimensions of wide rotor poles 64 and intermediate rotor poles 54, both remain in minimum reluctance relationship with their respective energized stator poles as narrow rotor poles 44 move into minimum reluctance relationship with stator poles 24c and 24i.

The present invention thus provides a switched reluctance motor wherein during each phase energization, the rotor rotates angularly a predetermined amount as the result of three stator pole/rotor pole interactions between three separate sets of stator and rotor poles. During each phase energization, all of the energized stator poles ultimately interact with a corresponding rotor pole to produce the angular rotation of rotor 40. In the embodiment shown, the six stator poles energized during a particular phase energization all ultimately interact with the six rotor poles during the phase energization. More specifically, during each phase energization, rotor 40 and stator 20 undergo a first state or condition wherein two rotor/stator pole interactions exist, then move to a second state or condition wherein four stator/rotor pole interactions exist and finally move to a third state or condition wherein six stator/rotor pole interactions exist. Stator 20 thus experiences a more balanced force system as near the end of each phase energization, the attractive forces between the rotor and stator are distributed at six locations that are about 60 degrees apart. As one phase changes to another, because of the uniform distribution of forces at the end of an energized phase, the stator relaxes from a circular configuration, thereby reducing vibration and acoustical noise generated by the motor. More importantly, continuous torque is produced throughout the phase energization as the various sized rotor poles interact with their respective stator poles to produce continuous angular rotation of rotor 40.

Figure 7:
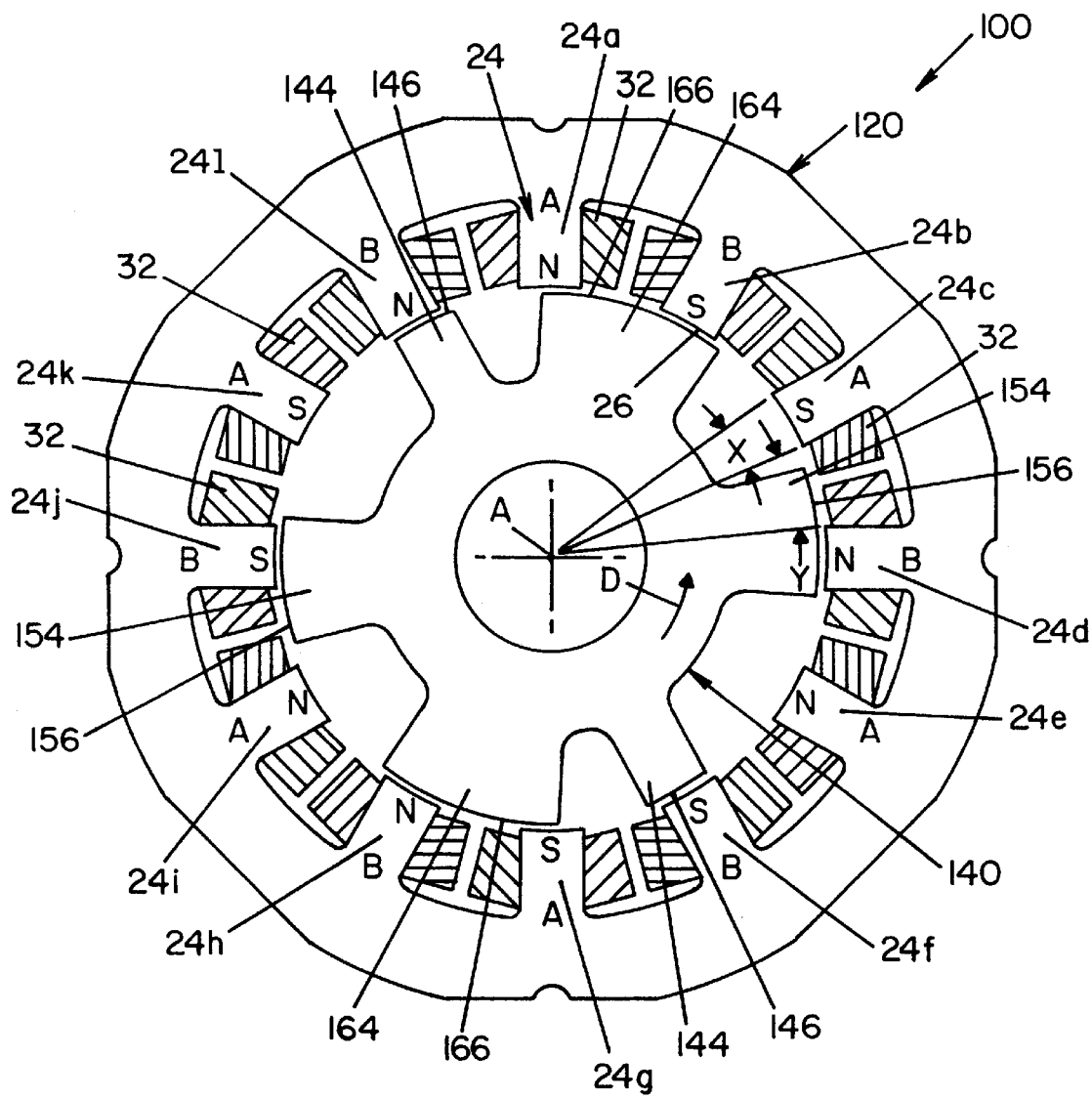
FIG. 7 is a sectional view of a 12/6 switched reluctance motor illustrating an alternate embodiment of the present invention.

Referring now to FIG. 7, an alternate embodiment of the present invention is shown. FIG. 7 discloses a motor designated 100 having a stator 120 and a rotor 140. Stator 120 is similar to stator 20 of the embodiment shown in FIGS. 1–6, except that the angular dimension of stator pole faces 26 has been increased, thereby reducing the dimension of gap 28 therebetween. In the embodiment shown, each stator pole face has an angular dimension of about 14° and each gap 28 has an angular dimension of about 16°. Like reference numbers have been used to designate like components, as in FIGS. 1–6. Rotor 140, like rotor 40 of the previous embodiment, includes wide rotor poles, intermediate rotor poles and narrow rotor poles, designated 164, 154 and 144, respectively. In this embodiment, the positions of intermediate rotor pole 154 and narrow rotor pole 144 on rotor 140 have been reversed, and the angular dimensions of wide rotor pole face 166 and intermediate rotor pole face 156 have been increased to correspond to the increase in the dimension of stator pole faces 26. In this respect, wide rotor pole face 166 of wide rotor pole 164 is almost equal to the dimension of two adjacent stator poles and the gap defined therebetween. Similarly, intermediate rotor pole face 156 of intermediate rotor pole 154 is almost equal to the angular dimension of a stator pole face and a gap adjacent the stator pole face.

With respect to the configuration of rotor 140, operation of motor 100 is basically similar to that of motor 10 as previously described. Specifically, rotation of rotor 140 is created by three distinct rotor pole-to-stator pole interactions that occur in the same sequence as previously described. In this respect, wide rotor poles 164 interact with a first set of energized stator poles, intermediate rotor poles 154 then interact with a second set of energized stator poles, and finally, narrow rotor poles 144 interact with a third set of energized stator poles. Each of the foregoing interactions produces torque that in turn results in angular rotation of rotor 140. In the specific embodiment shown, wide rotor poles 164 first interact with energized stator poles 24a and 24g, then intermediate rotor poles 154 interact with energized stator poles 24c and 24i, and finally, narrow rotor poles 144 interact with energized stator poles 24e and 24k to produce the angular rotation of rotor 140 during energization of phase A.

With respect to the dimensions of wide rotor pole face 166 and narrow rotor pole face 146, as can be seen from the drawings, the increase in the dimension of these rotor poles means that wide rotor pole face 156 begins to overlap stator poles of an unenergized phase prior to narrow rotor poles 144 being fully aligned, i.e., in a position of full minimum reluctance relative to energized stator poles. This slight overlap of an unenergized set of stator poles produces a more uniform transition and continuous torque as one phase changes to another.

FIG. 7 thus illustrates that the relative position of the wide rotor poles, the intermediate rotor poles and the narrow rotor poles of the rotor relative to each other is not critical, it being critical that such poles be positioned relative to the energized stator poles of a particular phase to produce the desired three-step or three-state angular rotation. Similarly, the dimension of the pole faces may vary slightly based upon the desired operating characteristics of the motor.

Figure 8:
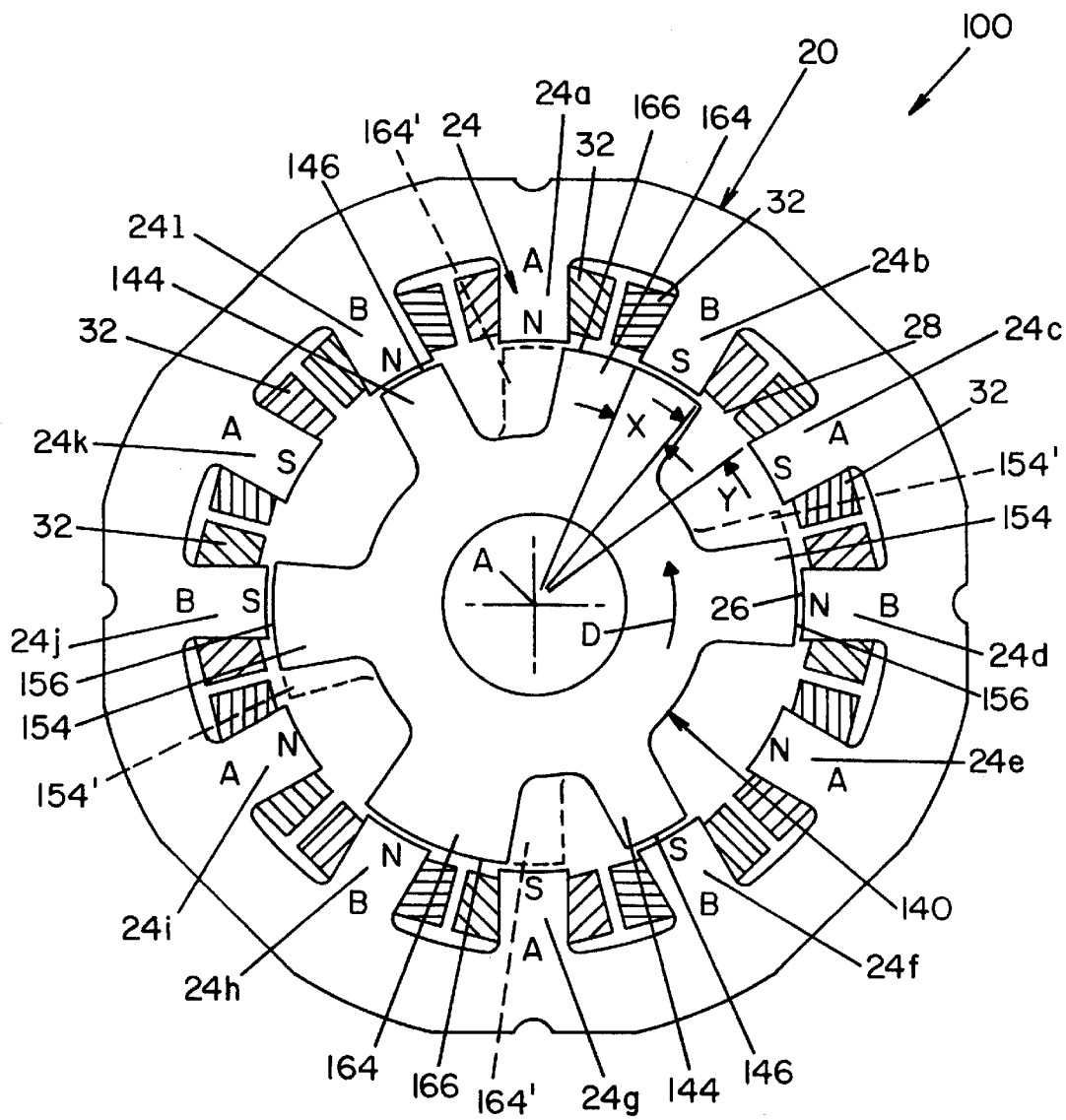
FIG. 8 is a sectional view of a switched reluctance motor illustrating a third embodiment of the present invention.

Referring now to FIG. 8, as indicated above, the dimensions of stator pole face(s) 26 and gap(s) 28 may vary without deviating from the present invention. FIG. 8 shows a motor 100 having a stator 20 wherein dimension "X" of each stator pole face 26 is 15° and dimension "Y" of each gap 28 is 15°, illustrating one preferred limit of the range of sizes of stator pole face 26 and gap 28. In the embodiment shown, narrow rotor pole 144 has a narrow rotor pole face 146 approximately equal to dimension "X" of stator pole face 26 (i.e., about 15°), intermediate rotor poles 154 has an intermediate rotor pole face 156 approximately equal to dimension "X" of stator pole face 26 and half of dimension "Y" of gap 28 (i.e., about 22.5°) and wide rotor pole 164 has a wide rotor pole face 166 approximately equal to the dimension "X" of stator pole face 26 plus dimension "Y" of gap 28 (i.e., about 30°).

The phantom lines 164' and 154' adjacent wide rotor poles 164 and intermediate rotor poles 154 show the dimensions of such poles if wide rotor pole 164 was dimensioned to be three (3) times the dimension of stator pole face 26 and if intermediate rotor pole 154 was dimensioned to be twice (2) the dimension of stator pole face 26, as was the case in the embodiment shown in FIGS. 1–6.

If wide rotor pole 164 was dimensioned to be three (3) times the dimension "X" of stator pole face 26 as in the embodiment shown in FIGS. 1–6, wide rotor poles 164 would be in alignment with stator poles 24a and 24g at the end of phase B energization, as shown in FIG. 8. In this position, wide rotor poles would be in minimum reluctance position when phase A is energized, and would not contribute any torque, or rotation, to rotor 140. For this reason, in a design where the dimensions "X" and "Y" of stator pole face(s) 26 and gap(s) 28 are equal or near equal to each other, the dimension of wide rotor pole face 166 will preferably be less than three (3) times the dimension of stator pole face 26 and the dimension of intermediate rotor pole 154 preferably will be less than twice (2) the dimension of stator pole face.

Figure 9:
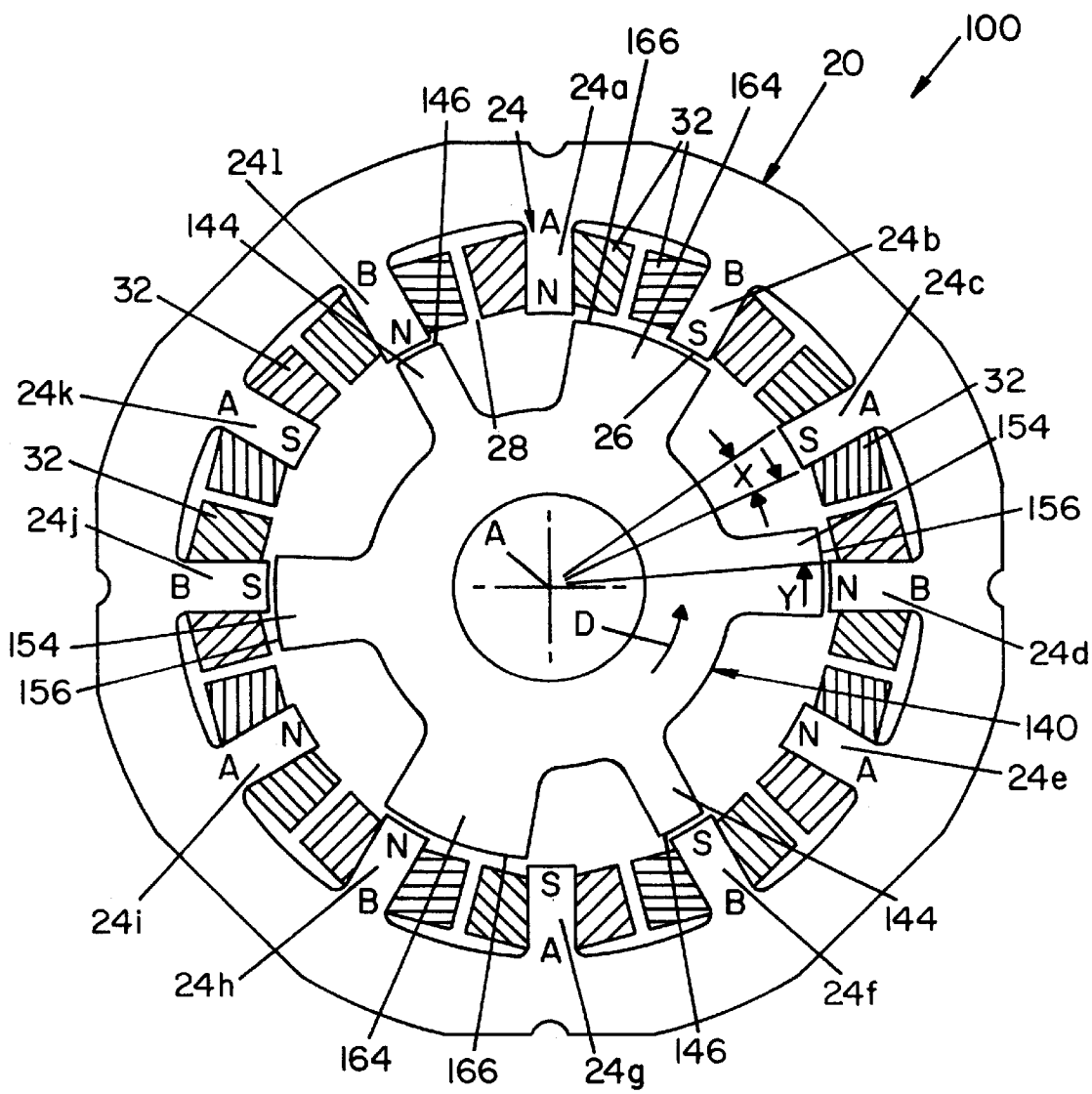
FIG. 9 is a sectional view of a switched reluctance motor illustrating a fourth embodiment of the present invention.

FIG. 9 shows the other preferred limit to the range of dimensions of stator pole face(s) 26 and gap(s) 28. In FIG. 9, stator 20 is dimensioned to have a plurality of stator poles 24a–24l, wherein each stator pole face 26 has a dimension "X" equal to approximately 10°, and gap(s) 28 between each stator pole face 26 has a dimension "Y" equal to about 20°. In this respect, the dimension of gap(s) 28 is approximately twice (2) the dimension of stator pole face(s) 26. In this embodiment, to insure the desired three-step rotation of rotor 120, narrow rotor pole 144 has a narrow rotor pole face 146 approximately equal to the dimension of stator pole face 26 (i.e., about 10°). Intermediate rotor pole 154 has an intermediate rotor pole face 156 dimensioned to be approximately twice (2) the dimension "X" of stator pole face 26 (i.e., about 20°). Wide rotor pole 146 has a wide rotor pole face 166 dimensioned to about three (3) times the dimension "X" of stator pole face 26 (i.e., about 30°). As shown in FIG. 9, at the end of phase B energization, the leading edges of wide rotor poles 164 are adjacent stator poles 24a and 24g such that energization of such stator poles causes rotation of the wide rotor poles into minimum reluctance position therewith.

The embodiments shown in FIGS. 8 and 9 thus illustrate how the dimensions of the rotor poles 144, 154 and 164 are essentially based upon the dimensions of stator pole face 26 and gap 28.

The foregoing description discloses preferred embodiments of the present invention. It should be appreciated that the embodiments are described for the purpose of illustration only, and that numerous alterations and modifications may be practice by those skilled in the art without departing from the spirit and scope of the invention. It is intended that all such modifications and alterations be included insofar as they come within the scope of the invention as claimed or the equivalents thereof.

Having described the invention, the following is claimed:

1. A switched reluctance machine, comprising:
   a first stationary element having a plurality of uniformly-spaced, like stationary poles;
   a second element comprised of a first pole having a first pole face of a first size, a second pole having a second pole face of a second size, and a third pole having a third pole face of a third size, said first, second and third poles being spaced from each other in a predetermined direction; and
   windings for two phases wound about poles of said first element such that each pole is separated by a winding and an associated pole of a different phase;
   said first element disposed relative to said second element wherein energization of one of said two phases causes said second element to be movable a predetermined distance in said predetermined direction relative to said first element, said first pole of said second element being in minimum reluctance relation with a first uniform pole of said first element when said second element has moved a first portion of said predetermined distance, said second pole of said second element being in a minimum reluctance relation with a second uniform pole of said first element when said second element has moved another portion of said predetermined distance, said first pole of said second element remaining in a minimum reluctance relation with said first uniform pole of said first element when said second pole of said second element is in a minimum reluctance relationship with said second uniform pole of said first element, and said third pole of said second element being in a minimum reluctance relation with a third uniform pole of said first element when said second element has moved another portion of said predetermined distance, said first and second poles of said second element remaining in a minimum reluctance relation with said first and second uniform poles of said first element when said third pole of said second element is in a minimum reluctance relationship with said third uniform pole of said first element.

2. A machine as defined in claim 1, wherein said first pole is a wide pole defining said first pole face, said second pole is an intermediate pole defining said second pole face and said third pole is a narrow pole defining said third pole face.

3. A machine as defined in claim 2, wherein a space is defined between adjacent said like stationary poles and said second element is dimensioned such that:
   said wide pole spans at least one stationary pole and said space adjacent said stationary pole,
   said intermediate pole spans at least one stationary pole and one half of said space adjacent said stationary pole, and
   said narrow pole spans at least said stationary pole.

4. A machine as defined in claim 3, wherein said first stationary element is a stator having twelve (12) radially oriented stator poles and said second element is a rotor having six (6) radially oriented rotor poles, two (2) of said six (6) rotor poles being wide poles, two (2) being intermediate poles and two (2) being narrow poles.

5. A switched reluctance motor driven by a two-phase source, comprising:
   a stator having a plurality of evenly spaced, radially oriented, like stator poles;
   windings for each of the two phases of the motor wound about said stator poles such that each of said stator poles is circumferentially separated by a winding and an associated stator pole of a different phase; and
   a rotor element mounted for rotation relative to said stator, said rotor element having a wide rotor pole, an intermediate rotor pole and a narrow rotor pole, said rotor poles being distributed on said rotor wherein said rotor poles travel along a same circumferential path in a direction of rotation, said rotor poles being dimensioned such that the energization of one of said two phases causes said wide rotor pole to interact with a first stator pole to induce a first torque on said rotor element and to produce a first predetermined angular rotation of said rotor element, and thereafter causes said intermediate rotor pole to interact with a second stator pole to induce a second torque on said rotor element and to produce a second predetermined angular rotation of said rotor element, and thereafter causes said narrow pole to interact with a third stator pole to induce a third torque on said rotor element and to produce a third predetermined angular rotation on said rotor element.

6. A motor as defined in claim 5, wherein said first predetermined angular rotation of said rotor causes said wide rotor pole to move into a minimum reluctance position with said first stator pole, said second predetermined angular rotation of said rotor causes said intermediate rotor pole to move into a minimum reluctance position with said second stator pole and said third predetermined angular rotation of said rotor causes said narrow rotor pole to move into a minimum reluctance position with said third stator pole.

7. A motor as defined in claim 6, wherein said wide rotor pole is in minimum reluctance position with said first stator pole when said intermediate rotor pole is in minimum reluctance position with said second stator pole, and said wide rotor pole and said intermediate rotor pole are in minimum reluctance positions with said first and second stator poles, respectively, when said narrow rotor pole is in minimum reluctance position with said third stator pole.

8. A motor as defined in claim 5, wherein a uniform gap is defined between adjacent stator poles and said wide rotor pole is dimensioned to span at least one stator pole and the gap adjacent said stator pole, said intermediate rotor pole is dimensioned to span at least one stator pole and one-half the gap adjacent said stator pole and said narrow rotor pole is dimensioned to span at least one stator pole.

9. A motor as defined in claim 8, wherein said rotor is formed of a plurality of like laminations.

10. A switched reluctance motor driven by a two-phase source, comprising:
a stator having a plurality of evenly distributed, like poles thereon, each of said poles having a stator pole face;
windings for each of the two phases of said motor wound about said stator poles such that each of said stator poles is circumferentially separated by at least one winding and an associated stator pole of a different phase; and
a rotor element mounted for rotation relative to said stator, said rotor element having a wide rotor pole having a wide rotor pole face, an intermediate rotor pole having an intermediate rotor pole face and a narrow rotor pole having a narrow rotor pole face, said rotor poles being distributed on said rotor wherein said narrow rotor pole, said intermediate rotor pole and said wide rotor pole travel along a same circumferential path, said rotor poles being dimensioned such that energization of one of said phases causes a predetermined angular rotation of said rotor wherein a first portion of said angular rotation is created by said wide rotor pole being drawn into a minimum reluctance position relative to a first energized stator pole, a second portion of said angular rotation is created by said intermediate rotor pole being drawn into a minimum reluctance position with a second energized stator pole and a third portion of said angular rotation is created by said narrow rotor pole being drawn into a minimum reluctance position with a third energized stator pole.

11. A motor as defined in claim 10, wherein a uniform gap is defined between adjacent stator poles and said wide rotor pole is dimensioned to span at least one stator pole and the gap adjacent said stator pole, said intermediate rotor pole is dimensioned to span at least one stator pole and one-half the gap adjacent said stator pole and said narrow rotor pole is dimensioned to span at least one stator pole.

12. A motor as defined in claim 11, wherein said wide rotor pole is in said minimum reluctance position when said intermediate rotor pole is in said minimum reluctance position.

13. A motor as defined in claim 12, wherein said wide rotor pole and said intermediate rotor pole are in said minimum reluctance positions when said narrow rotor pole is in said minimum reluctance position.

14. A switched reluctance motor driven by a two-phase source, comprising:
a stator having a plurality of like, evenly distributed, radially oriented stator poles, each of said poles having a stator pole face;
windings for each of the two phases of said motor wound about said stator poles such that adjacent stator poles are circumferentially separated by at least one winding and an associated stator pole of a different phase; and
a rotor element mounted for rotation relative to said stator, said rotor element having a wide rotor pole having a wide rotor pole face, an intermediate rotor pole having an intermediate rotor pole face and a narrow rotor pole having a narrow rotor pole face, said rotor poles distributed on said rotor wherein said narrow rotor pole, said intermediate rotor pole and said wide rotor pole travel along a same circumferential path, said rotor poles being dimensioned such that a uniform gap is defined between said rotor pole faces and said stator pole faces and energization of one of said two phases causes said wide rotor pole to magnetically interact with a first stator pole, causes said intermediate rotor pole to magnetically interact with a second stator pole and causes said narrow rotor pole to magnetically interact with a third stator pole to rotate said rotor a predetermined angular amount, an area of overlap of said rotor pole faces relative to said stator pole faces increasing as said rotor moves said predetermined angular amount.

15. A motor as defined in claim 14, wherein said wide rotor pole interacts with said first stator pole to cause said rotor element to rotate a first portion of said predetermined angular amount, said intermediate rotor pole interacts with said second stator pole to cause said rotor element to rotate a second portion of said predetermined angular amount and said narrow rotor pole interacts with said third stator pole to cause said rotor element to rotate a third portion of said predetermined angular amount.

16. A motor as defined in claim 15, wherein said first predetermined angular rotation of said rotor causes said wide rotor pole to move into a minimum reluctance position with said first stator pole, said second predetermined angular rotation of said rotor causes said intermediate rotor pole to move into a minimum reluctance position with said second stator pole and said third predetermined angular rotation of said rotor causes said narrow rotor pole to move into a minimum reluctance position with said third stator pole.

17. A motor as defined in claim 16, wherein said wide rotor pole is in minimum reluctance position with said first stator pole when said intermediate rotor pole is in minimum reluctance position with said second stator pole, and said wide rotor pole and said intermediate rotor pole are in minimum reluctance positions with said first and second stator poles, respectively, when said narrow rotor pole is in minimum reluctance position with said third stator pole.

18. A motor as defined in claim 17, wherein a uniform gap is defined between adjacent stator poles and said wide rotor pole is dimensioned to span at least one stator pole and the gap adjacent said stator pole, said intermediate rotor pole is dimensioned to span at least one stator pole and one-half the gap adjacent said stator pole and said narrow rotor pole is dimensioned to span at least one stator pole.

19. A switched reluctance motor driven by a two-phase source, comprising:

a stator having a plurality of like, evenly distributed, radially oriented stator poles, each of said stator poles having a stator pole face;

windings for each of the two phases of said motor wound about said stator poles such that each of said stator poles is circumferentially separated by at least one winding and an associated stator pole of a different phase; and a rotor element mounted for rotation relative to said stator, said rotor element having a wide rotor pole having a wide rotor pole face, an intermediate rotor pole having an intermediate rotor pole face and a narrow rotor pole having a narrow rotor pole face, said rotor poles distributed on said rotor wherein said narrow rotor pole, said intermediate rotor pole and said wide rotor pole travel along a same circumferential path, said rotor poles being dimensioned relative to said stator poles such that said motor has an inductance-to-angular rotation profile wherein the inductance of a phase increases over a first angle of rotation and decreases over a second angle of rotation and said first angle of rotation is at least twice said second angle of rotation.

20. A switched reluctance motor, comprised of:

a stator having six evenly spaced, radially oriented, like stator poles;

a rotor element mounted for rotation relative to said stator, said rotor element having three rotor poles, one of said rotor poles being a wide rotor pole, one of said rotor pole being an intermediate rotor pole and one of said rotor poles being a narrow rotor pole, said rotor poles being distributed on said rotor wherein said narrow rotor pole, said intermediate rotor pole and said wide rotor pole travel in a same circumferential path, said rotor poles dimensioned such that said wide rotor pole spans at least one stator pole and a gap adjacent said stator pole, said intermediate rotor pole spans at least one stator pole and half of a gap adjacent said stator pole and said narrow rotor pole spans at least one stator pole; and windings for two phases wound about stator poles that are circumferentially separated by at least one winding and an associated stator pole of a different phase.

21. A motor as defined in claim 20, wherein energization of each of said phases causes a predetermined angular rotation of said rotor and said wide rotor pole interacts with a first stator pole to cause a first portion of said angular rotation, said intermediate rotor pole interacts with a second stator pole to cause a second portion of said angular rotation and said narrow rotor pole interacts with a third stator pole to cause a third portion of said angular rotation.

22. A motor as defined in claim 21, wherein said first predetermined angular rotation of said rotor causes said wide rotor pole to move into a minimum reluctance position with said first stator pole, said second predetermined angular rotation of said rotor causes said intermediate rotor pole to move into a minimum reluctance position with said second stator pole and said third predetermined angular rotation of said rotor causes said narrow rotor pole to move into a minimum reluctance position with said third stator pole.

23. A motor as defined in claim 22, wherein said wide rotor pole is in minimum reluctance position with said first stator pole when said intermediate rotor pole is in minimum reluctance position with said second stator pole, and said wide rotor pole and said intermediate rotor pole are in minimum reluctance positions with said first and second stator poles, respectively, when said narrow rotor pole is in minimum reluctance position with said third stator pole.

24. A switched reluctance motor driven by a two-phase source, comprising:

a stator having twelve (12) evenly spaced, radially oriented, like poles defining a gap between adjacent stator poles;

windings for each of the two phases of the motor wound about said stator poles wherein said stator poles are circumferentially separated by a winding and an associated stator pole of a different phase; and a rotor mounted for rotation relative to said stator, said rotor having six (6) rotor poles, said rotor dimensioned such that, during each phase energization said motor has a first state wherein two (2) of said rotor poles are magnetically coupled to a like number of stator poles, a second state wherein four (4) of said rotor poles are magnetically coupled to a like number of stator poles and a third state wherein all six (6) of said rotor poles are magnetically coupled to a like number of energized stator poles.

25. A motor as defined in claim 24, wherein said rotor has at least one wide rotor pole, at least one intermediate rotor pole and at least one narrow rotor pole.

26. A motor as defined in claim 25, wherein in said first state said at least one wide rotor pole is magnetically coupled to a first stator pole, in said second state said at least one wide rotor pole is magnetically coupled to said first stator pole and said at least one intermediate rotor pole is magnetically coupled to a second stator pole and in said third state said at least one wide rotor pole is magnetically coupled to said first stator pole, said at least one intermediate rotor pole is magnetically coupled to said second stator pole and said at least one narrow rotor pole is magnetically coupled to a third stator pole.

27. A motor as defined in claim 26, wherein each of said stator poles has a pole face width of like dimension, said at least one narrow rotor pole has a pole face width approximately equal to a stator pole face width, said at least one intermediate rotor pole has a pole face width approximately equal to twice a stator pole face width and said at least one wide rotor pole has a pole face width approximately equal to three times the width of a stator pole face.

28. A switched reluctance motor driven by a two-phase source, comprising:

a stator having a number of evenly-spaced, like stator poles defining a gap between each stator pole, the number of stator poles being a whole number multiple of three and even;

windings for each of the two phases of the motor wound about stator poles that are circumferentially separated by a winding and an associated stator pole of a different phase; and a rotor mounted for rotation relative to said stator, said rotor having a number of rotor poles, the number of rotor poles being one-half the number of stator poles, said rotor poles being dimensioned such that when said phases are alternately energized, said rotor poles operatively interact with said stator poles such that said motor sequentially advances to a first state wherein one-third of said rotor poles are magnetically coupled to a like number of said stator poles, to a second state wherein two-thirds of said rotor poles are magnetically coupled to a like number of stator poles and to a third state wherein all of said rotor poles are magnetically coupled to a like number of stator poles.

29. A motor as defined in claim 28, wherein said rotor has at least one wide rotor pole, at least one intermediate rotor pole and at least one narrow rotor pole.

30. A motor as defined in claim 29, wherein in said first state, said at least one wide rotor pole is magnetically coupled to a first stator pole, in said second state, said at least one wide rotor pole is magnetically coupled to said first stator pole and said at least one intermediate rotor pole is magnetically coupled to a second stator pole and in said third state said at least one wide rotor pole is magnetically coupled to said first stator pole, said at least one intermediate rotor pole is magnetically coupled to said second stator pole and said at least one narrow rotor pole is magnetically coupled to a third stator pole.

31. A motor as defined in claim 30, wherein each of said stator poles has a pole face width of like dimension, said at least one narrow rotor pole has a pole face width approximately equal to a stator pole face width, said at least one intermediate rotor pole has a pole face width approximately equal to twice a stator pole face width and said wide rotor pole has a pole face approximately equal to three times a stator pole face width.

32. A motor as defined in claim 28, wherein said motor changes from said first state to said second state to said third state during each phase energization.

* * * * *